United States Patent [19]

Ono et al.

[11] Patent Number: 4,796,571
[45] Date of Patent: Jan. 10, 1989

[54] THERMAL RESPONSE TYPE FLUID FAN COUPLING DEVICE

[75] Inventors: Yuichi Ono; Kazunori Takikawa, both of Numazu, Japan

[73] Assignee: Usui Kokusai Sangyo Kabushiki Kaisha, Sunto, Japan

[21] Appl. No.: 132,152

[22] Filed: Dec. 14, 1987

[30] Foreign Application Priority Data

Dec. 16, 1986 [JP] Japan .................. 61-299323

[51] Int. Cl.⁴ ............................................. F16D 31/00
[52] U.S. Cl. .............................. 123/41.12; 192/82 T; 192/58 B
[58] Field of Search .................. 123/41.12; 192/58 B, 192/82 T

[56] References Cited

U.S. PATENT DOCUMENTS

| | | | |
|---|---|---|---|
| 3,059,745 | 10/1962 | Tauschek | 192/82 T |
| 3,215,235 | 11/1965 | Kamm | 192/58 B |
| 4,653,625 | 3/1987 | Neugebauer | 192/82 T X |
| 4,665,694 | 5/1987 | Brunken | 192/82 T X |
| 4,676,355 | 6/1987 | Brunken et al. | 192/82 T X |

Primary Examiner—Tony M. Argenbright
Assistant Examiner—Eric R. Carlberg
Attorney, Agent, or Firm—Anthony J. Casella; Gerald E. Hespos

[57] ABSTRACT

A thermal response type fluid fan coupling device which is constituted by a sealed chamber which is divided into an oil accumulating chamber and a torque transmission chamber, and which accommodates a driving disc, by a separting plate having an oil flow adjusting hole, in which a dam is provided in a circulated passage connecting the torque transmission chamber and the oil accumulating chamber, and a valve member for opening and closing the flow adjusting hole in accordance with change in ambient temperature is provided so as to control torque transmission from the driving side to the follower side by changing the effective oil contact area in a gap for transmitting torque between the driving disc and the case and the cover, wherein an idle oil accumulating chamber which is connected to an oil introducing gap which is connected to the torque transmission chamber is provided at the position outer than the dam in the radial direction, and oil introducing means for connecing the oil accummulating chamber and the torque transmission chamber only when the device is stopped is provided.

15 Claims, 13 Drawing Sheets

THERMAL RESPONSE TYPE FLUID FAN COUPLING DEVICE

BACKGROUND OF THE INVENTION

1. Field of the Invention:

This invention relates to further improvement of a thermal response type fluid fan coupling device which was disclosed in Japanese Patent Publication No. 7846/1984 by the applicant of the present invention. This thermal response type fluid fan coupling device is arranged to usually control an engine cooling fan of an automobile for the purpose of constantly supplying a suitable quantity of cooling air to the engine in accordance with the operating condition of an automobile.

2. Description of the Prior Art:

A known fan coupling device of the type described above comprises, as exemplified in FIG. 17, a sealed chamber formed by a cover 23' and a case 23''. The chamber is divided by means of a separating plate 24 having a flow-adjusting hole 24' into an oil accumulating chamber 25 and a torque transmission chamber 26 which includes a driving disc 22. A circulated passage 27 which is connected to a pumping function portion formed by a dam 28 which connects the torque transmission chamber 26 side and the oil accumulating chamber 25 side is provided. In the fan coupling device, in order to position at least one of an inlet port 27' and an outlet port 27'' of the flow passage 27 above the oil level in the oil accumulating chamber 25 regardless of the attitude of the fan coupling device when the engine stops, the outlet port 27'' is disposed in the opened area at the tip portion of an arc-shaped and substantially semicircular groove 29 which communicates with the circulated passage 27 which is provided by a separating wall secured to the inner surface of the oil accumulating chamber 25.

The above described conventional fan coupling device satisfies the object of preventing the accumulating of oil in the torque transmission chamber 26 caused by natural inverse flow from the oil accumulating chamber 25 through the flow passage 27 during the period when an automobile is parked when the circulated passage 27 is submerged under the oil level in the oil accumulating chamber 25. As a result of this, rapid increase in the fan speed as soon as the engine is started and abnormal noise from the fan can thereby be prevented, and effective warming up can be realized even when ambient temperature is low. However, when the engine is stopped with the flow adjusting hole submerged below the oil level in the oil accumulating chamber and a valve of the flow adjusting hole in the separating plate set to open the flow adjusting hole after high temperature usage of the engine has been carried out, a great quantity of oil accumulates in the torque transmission chamber as a result of the natural flow from the oil accumulating chamber through the flow adjusting hole. Consequently, as shown by symbol X in FIG. 18, when the engine is again started, the rotational speed of a follower side fan rises for a certain period of time, and so called uneven rotation of the fan occurs.

An object of the present invention is thus to provide a thermal response type fluid fan coupling device in which the uneven rotation of the fan can be kept to as substantially short a time as possible after the engine is started even when the engine is stopped after high temperature usage. Furthermore, in the thermal response type fluid fan coupling, an assured pumping function can be achieved from the outer circumferential portion of the torque transmission chamber to the circulated passage.

A thermal response type fluid fan coupling device according to the present invention constituted as follows: the inside of a sealed chamber which is supported on a rotational shaft whose tip is provided with a driving disc through a bearing and which comprises a case and a cover having cooling fans on the exterior surface thereof is divided by a separating plate which has an oil flow adjusting hole into an oil accumulating chamber and a torque transmission chamber accommodating the driving disc; a dam is formed between an exterior surface of the driving disc and an inner surface of the sealed chamber for the purpose of introducing oil into a circulated passage connecting the torque transmission chamber and the oil accumulating chamber; the inside of the sealed chamber is provided with a valve member which is arranged to open the flow adjusting hole in the separating plate when the ambient temperature exceeds a predetermined level and to close the same when the ambient temperature falls below a predetermined level in association with transformation of a thermosensitive body provided on the front surface of said cover, said transformation occuring in accordance with the change in the ambient temprature; an effective oil contact area in a gap portion for transmitting torque which is disposed between the surface of the case and cover and the surface of the driving disc, the surface opposing each other at the outer periphery of said driving disc is increased or decreased in order to control the torque transmission from the rotational shaft to the follower side of the sealed chamber, the thermal response type fluid coupling device being characterized in that an idle oil accumulating chamber which is connected to an introducing gap that is connected to the torque transmission chamber is provided at an outer position over a dam in the radial direction in said sealed chamber side and oil introducing means which is arranged to communicate the oil accumulating chamber and the torque transmission chamber only when the engine is stopped is provided in the separating plate. Furthermore, the device according to the present invention is characterized in that the oil introducing means is a circular penetrating hole disposed at a central position of the separating plate or a plurality of penetrating holes disposed on the same circumference of the axis of the separating plate.

The device according to the present invention is further characterized in that a sub-dam is provided in the vicinity of an inlet port of the circulated passage adjacent to the dam and the sub-dam is formed by a projecting wall which in part encloses a portion of said introducing gap on the side corresponding to the rotational direction and/or projecting wall projecting radially in the idle oil accumulating chamber.

The device according to the present invention is further characterized in that an inner space separating annular wall of the idle oil chamber is formed in such a manner that projections over the case and the cover are engaged with each other with a required gap remained for the introduction of oil and the gap for introducing oil comprises a gap disposed in the substantially axial direction and a gap disposed in the circumferential direction, and an exterior wall of the gap in the circumferential direction is formed in substantially the same plane as an inner wall of the outer periphery of the cover and the case, and the exterior wall of the gap in the circumferential direction has a tapered plane facing outwardly or inwardly. The gap disposed in the circumferential direction has a width larger than the distance beween the outer surface of the driving disc and the inner surface of the cover or the case.

The thermal response type fluid fan coupling device is further characterized in that the annular separating wall which forms the idle oil accumulating chamber is provided with at least one hole that is connected to the idle oil accumulating chamber. The device is further characterized in that the outer walls of the gap for introducing oil and the connecting hole which are axially disposed are formed in substantially the same plane as the inner wall at the outer periphery of the case and the cover. The device is further characterized in that the gap for introducing oil and the connecting hole have a tapered surface on the inner edge or outer edge thereof, and the width of each of the gap for introducing oil and the connecting hole is arranged to exceed the distances between the outer surface of the driving disc and both the inner surface of the case and the inner surface of the cover.

DETAILED DESCRIPTION OF PREFERRED EMBODIMENTS

Figure 1:
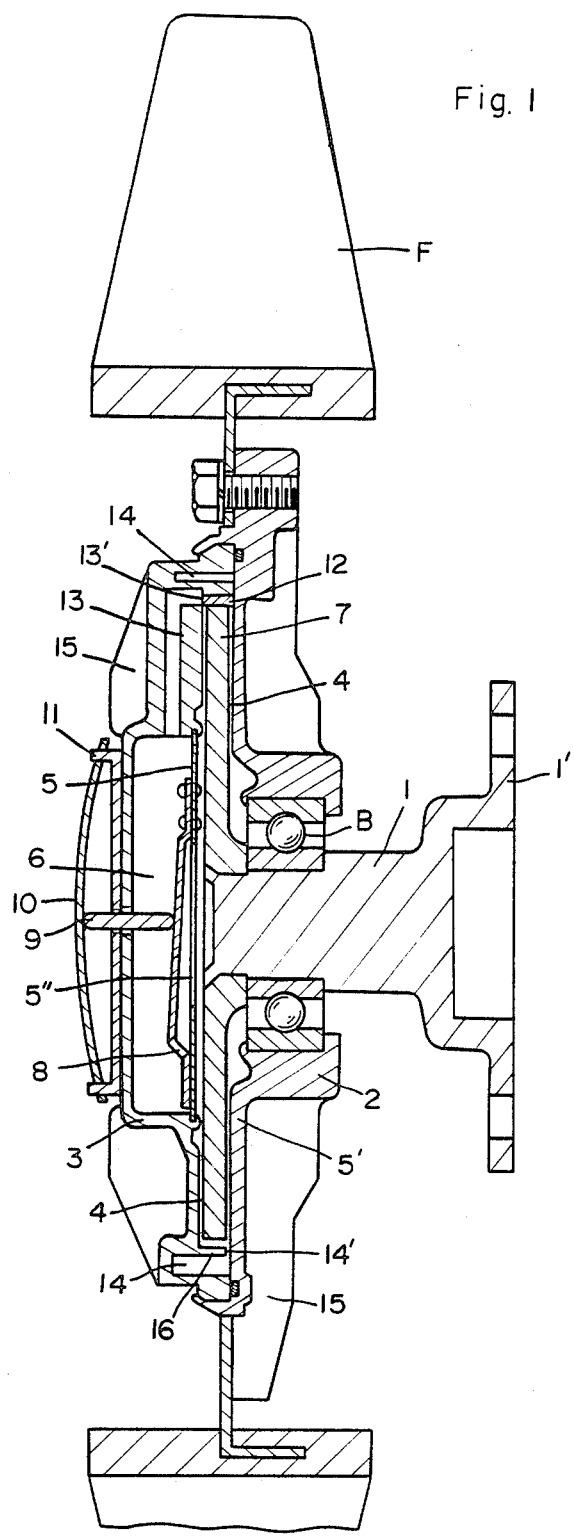
FIG. 1 is a vertical cross-sectional view of an embodiment of a thermal response type fluid fan coupling device according to the present invention.
Figure 2:
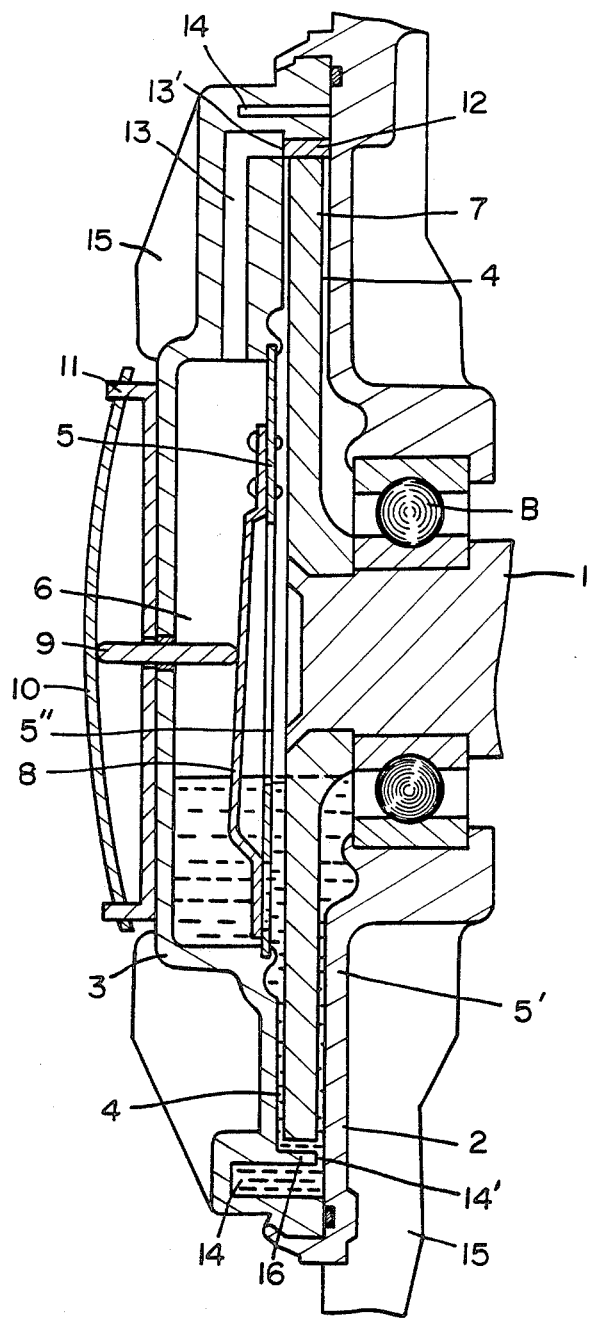
FIG. 2 is an enlarged view, from which a part is omitted, illustrating a state in which oil accumulates when the device shown in FIG. 1 is stopped.
Figure 3:
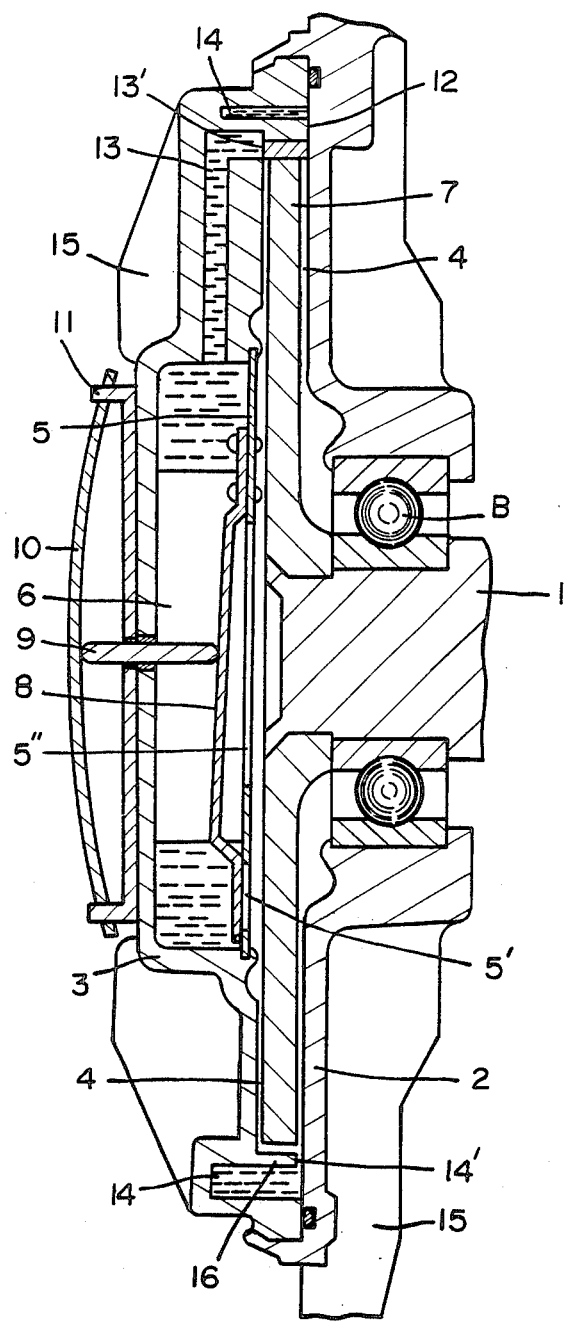
FIG. 3 illustrates a state in which oil accumulates when the device is about to start at low ambient temperatures and is being operated at low ambient temperatures.
Figure 4:
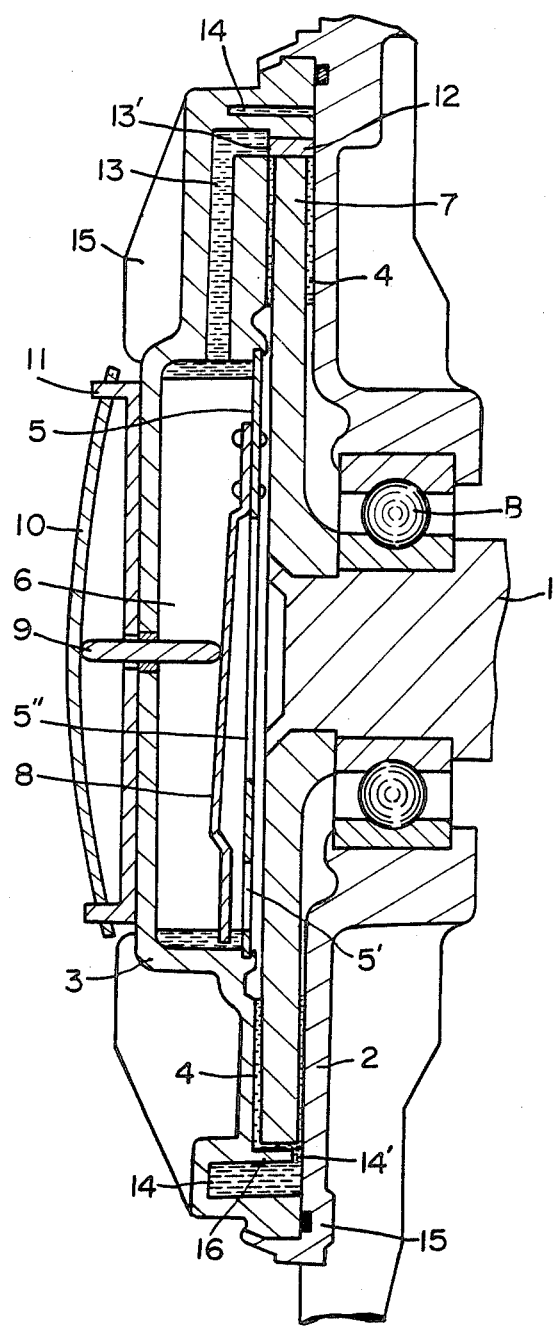
FIG. 4 illustrates a state in which oil accumulates when the device shown in FIG. 2 is about to start at high ambient temperatures and is being operated at high ambient temperatures.
Figure 5:
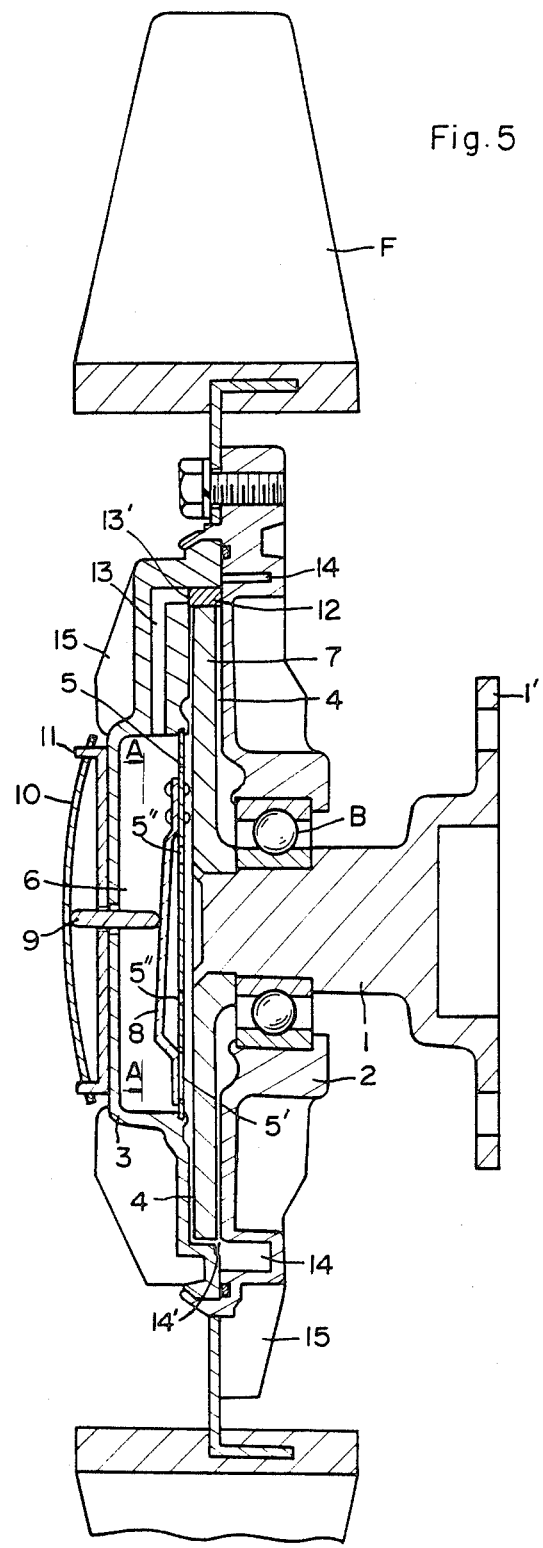
FIG. 5 is a view illustrating another embodiment of the device corresponding to that shown in FIG. 1.
Figure 6:
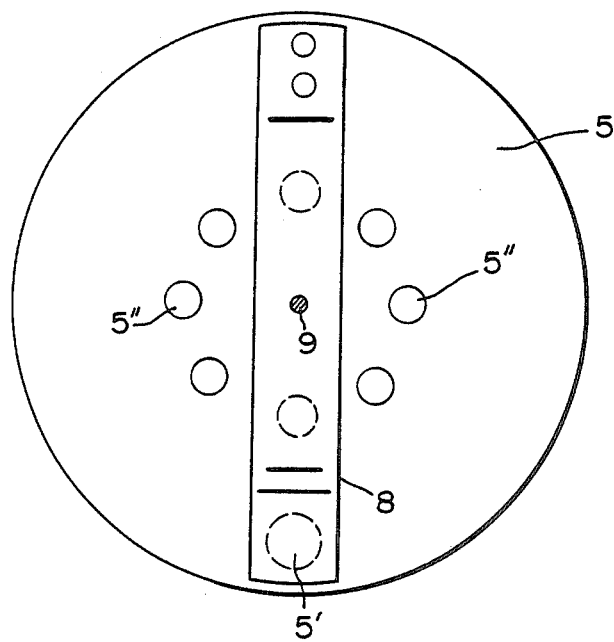
FIG. 6 is a plan view of a separating plate alone taken along the line A—A shown in FIG. 5.

In the drawings, parts which are the same are given the same reference number.

In FIGS. 1 to 6, reference numeral 1 represents a rotational body to which a driving disc 7 is secured at the front end thereof and which has a fastening flange wall 1' for fitting to the mating part body at the rear end thereof. The rotational body 1 supports a sealed chamber formed by a cover 3 and a case 2, cooling fans F being fitted to the outer portion of the sealed chamber.

Reference numeral 5 represents a separating plate for dividing the inside portion of the sealed chamber into an oil accumulating chamber 6 and a torque transmission chamber 4 in which the driving disc 7 is accommodated. An oil flow adjusting hole 5" for adjusting oil flow from the oil accumulating chamber 6 to the torque transmission chamber 4 is provided in the separating plate 5. Between the driving disc 7 and plates opposing the former, which plates are disposed in the sealed chamber, and which include the separating plate 5 is provided with a small gap in the torque transmission chamber 4 for the purpose of transmitting torque. Reference numeral 8 represents a valve member for opening and closing the oil flow adjusting hole 5". One end of the valve member 8 is screw-fixed to the surface of the separating plate 5, which suface faces the oil accumulating chamber 6, while another end is disposed in the oil flow adjusting hole 5' portion. The valve member 8 is disposed in the sealed chamber through a communicating bar 9 in such a manner that the valve member 8 is operated in association with transformation of a thermosensitive body 10 which is caused from change in ambient temperature. The thermosensitive body 10 is formed by a plate-shaped bimetal whose two ends are secured to a metal fastener 11 which is secured to the front surface of the cover 3. Reference numeral 12 represents a dam which is disposed in a partial portion of the inner surface of the sealed chamber, which inner surface opposes the outer surface of the driving disc 7 in which oil accumulates when the device is rotated. A circulated passage 13 is formed adjacent to the dam 12 in the rotational direction of the fan, which circulated passage 13 connects the torque transmission chamber 4 and the oil accumulating chamber 6 through an inlet port 13', whereby a pumping function is realized. Reference numeral 5" represents a circular penetrating hole (FIG. 1) which is disposed at the central position of the separating plate 5, or a plurality of penetrating holes (FIGS. 5 and 6) disposed in a circular configuration of an axis which serves as oil introducing means connecting the oil accumulating chamber 6 and the torque transmission chamber 4 only when the device is stopped.

Reference numeral 14 represents an annular idle oil accumulating chamber which is disposed outer in the radial direction than the dam 12 in the sealed chamber, and which is connected to an introducing gap 14' which is connected to the torque transmission chamber 4. The idle oil accumulating chamber 14 is separated by means of an annular separating wall 16 which is projected from the cover 3 or the case 2, and is arranged to have substantially the same capacity as the quantity of oil which has already been accumulated in the torque transmission chamber 4 and the idle oil chamber 14 when the device is stopped. Reference numeral 15 represents a cooling fan which radially and outwardly projects over the sealed chamber. The thermosensitive body 10 formed by the bimetal may be formed in a scroll shape and be arranged to cause the valve member 8 to move laterally with respect to the oil flow adjusting hole 5' in association with transformation of the scroll shaped thermosensitive body 10 caused by a rotation in the circumferential direction, for the purpose of opening and closing the oil flow adjusting hole 5'.

Figure 7:
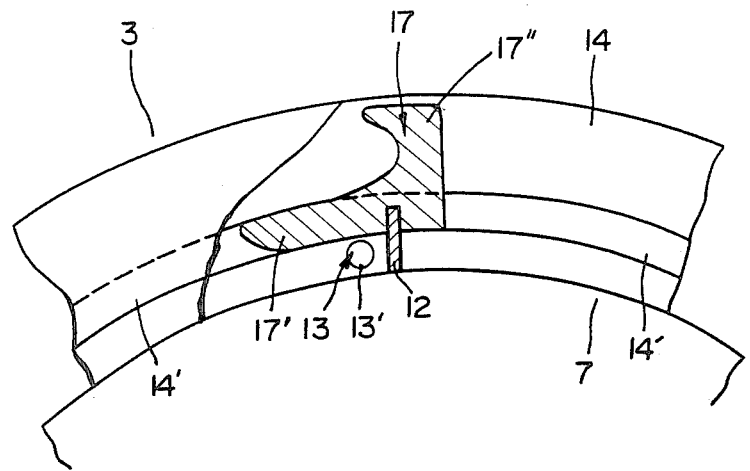
FIG. 7 is an enlarged plan view, from which a part is omitted, of a portion in the vicinity of a dam.
Figure 10:
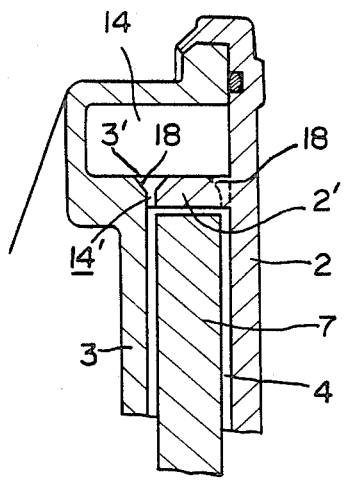
FIG. 10 is a cross-sectional view, from which a part is omitted, taken along the line B—B shown in FIG. 9.
Figure 9:
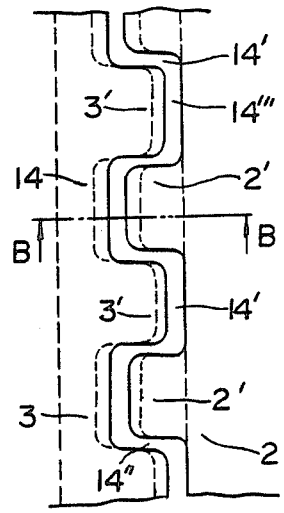
FIG. 9 is an enlarged view, from which a part is omitted, illustrating projecting walls which are engaged with each other, and which forms connecting means which is an essential portion of the device shown in FIG. 8.
Figure 8:
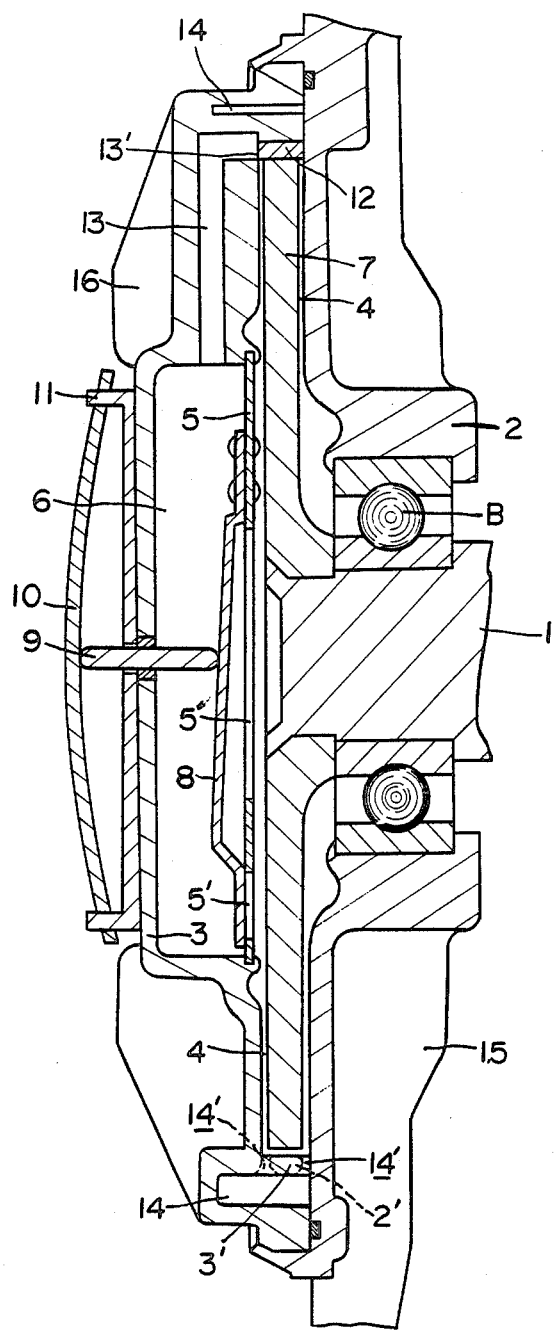
FIG. 8 is a vertical cross-sectional view of another embodiment of the thermal response type fluid fan coupling device according to the present invention.
Figure 11:
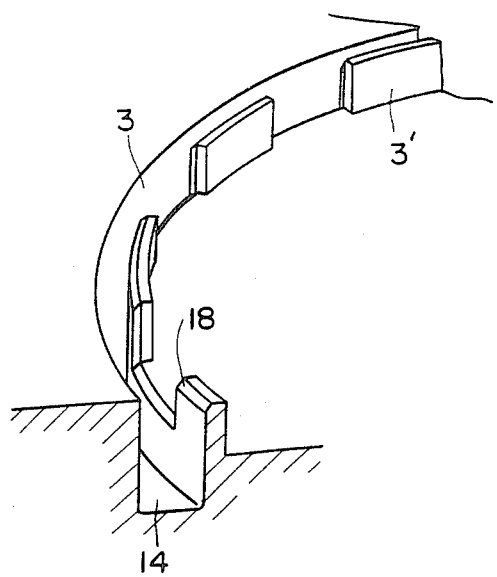
FIG. 11 is an enlarged perspective view, from which a part is omitted, of one case shown in FIG. 9.
Figure 12:
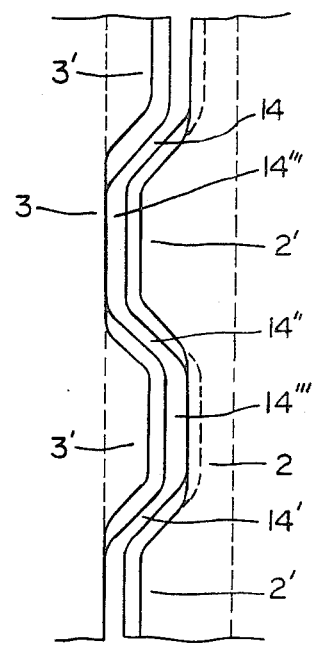
FIG. 12 illustrates another embodiment of the device corresponding to the device shown in FIG. 9.
Figure 13:
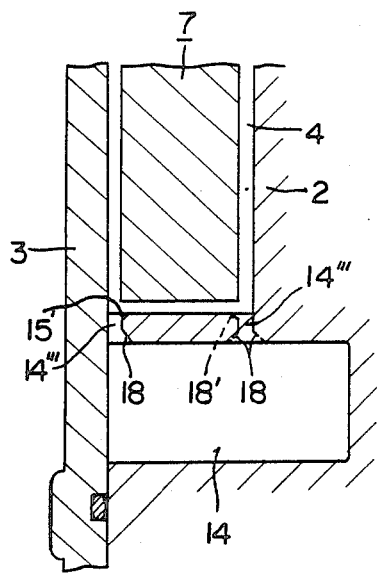
FIG. 13 is an enlarged cross-sectional view of a gap for introducing oil in the device shown in FIG. 12.

Furthermore, in this invention, a sub-dam 17 which is substantially formed in a L-shape in the idle oil accumulating chamber 14 is, as shown in FIG. 7, provided at the position adjacent to the inlet port 13' portion which is positoned adjacent to the dam 12. The sub-dam 17 comprises a projection wall 17' which in part closes on the side corresponding to the rotation of the introducing gap 14' and/or a projecting wall 17" which radially extends in the idle oil accumulating chamber 14. Thanks to the above mentioned structure, oil flowing the inside of the torque transmission chamber 4 due to the rotation of the driving disc 7 is stopped by the sub-dam 7, and the pressure at the upper stream of the dam is thereby raised. As a result of this, the pressure at the immediately front portion of the inlet port 13' is raised, whereby oil can be securely introduced into the circulated passage 13. Although a slight gap is provided between the outer surface of the radially projecting wall 17" of the sub-dam 17 and the inner surface of the idle oil accumulating chamber 14, it may be closed by omitting it.

A mechanism for accelerating the delivery of oil into the idle oil accumulating chamber 14 will now be described with reference to FIGS. 8 to 16. In an embodiment shown in FIGS. 8 to 13, as an alternative to the annular separating wall 16 of the idle oil accumulating chamber 14, a plurality of projection walls 2' and 3' are provided on the opposing walls of the case 2 and the cover 3, respectively, which form an inside-separating annular wall of the idle oil accumulating chamber 14. The projection walls 2' and 3' are arranged to be engaged with each other for the purpose of forming an introducing gap 14' formed by a gap 14" facing substantially the axial direction and a gap 14'" facing the circumferential direction between the projecting walls 2' and 3'.

The outer wall of the gap 14'" facing in the circumferential direction is arranged to be substantially on the same plane as the inner surface of the outer periphery of the cover 3 and case 2 in the torque transmission chamber 4. The outer wall of the gap 14'" has a tapered surface 18, the taper being arranged facing outside. Furthermore, the width of the outer wall of the gap 14'" is arranged to be greater than the length of a torque transmitting plane formed between the outer surface of the driving disc 7 and either one of the inner surfaces of the cover 3 or the case 2. In order to further accelerate introducing oil into the idle oil accumulating chamber 14, it is preferable to provide a tapered surface 18' on the inside of the introducing gap 14' (see FIGS. 12 and 13).

Figure 14:
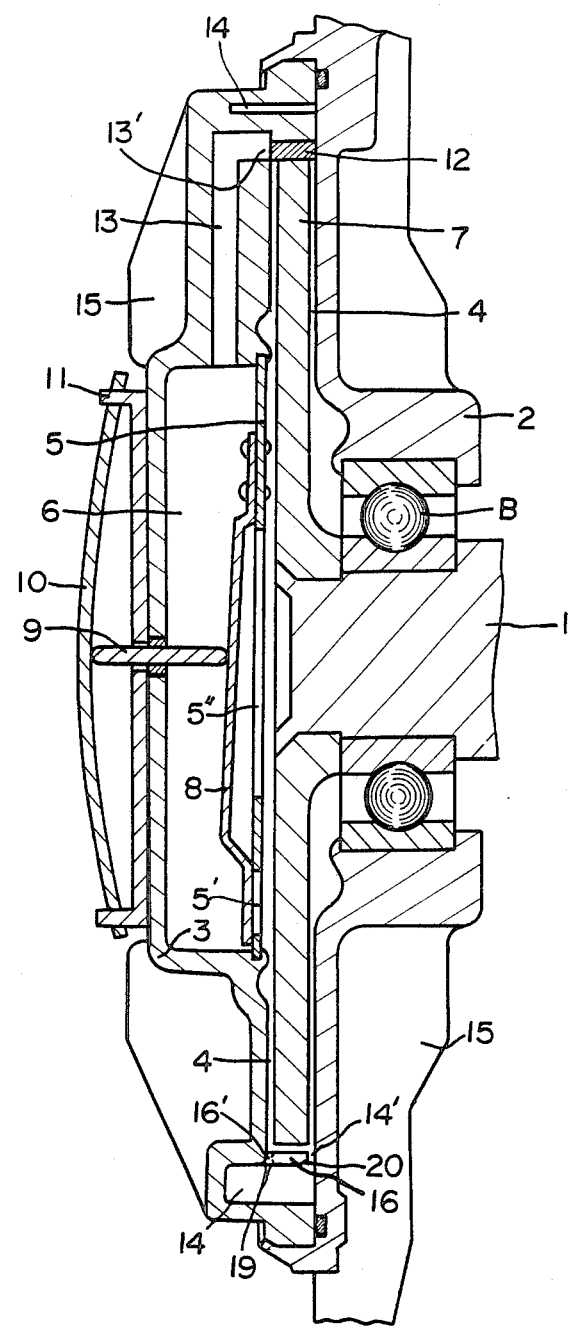
FIG. 14 is a vertical cross-sectional view of another embodiment of the thermal response type fluid fan coupling device according to the present invention.
Figure 15:
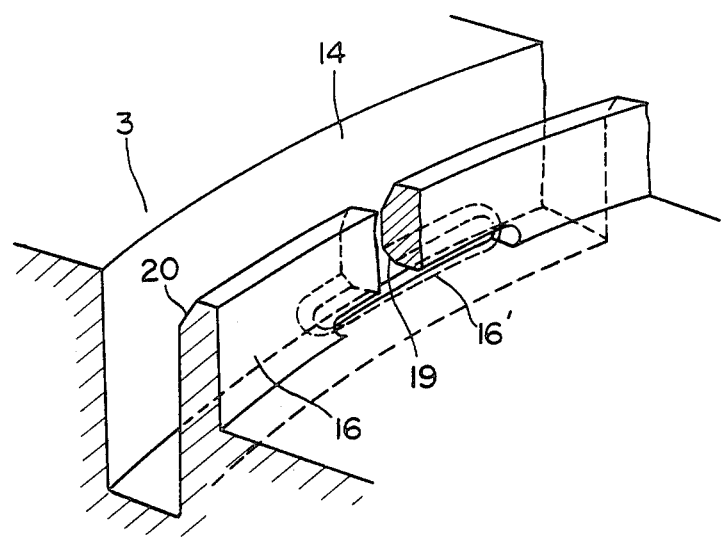
FIG. 15 is an enlarged perspective view, from which a part is omitted, of a portion in the vicinity of a separating wall including an idle oil accumulating chamber which forms the essential portion of the device according to the present invention shown in FIG. 14.
Figure 16:
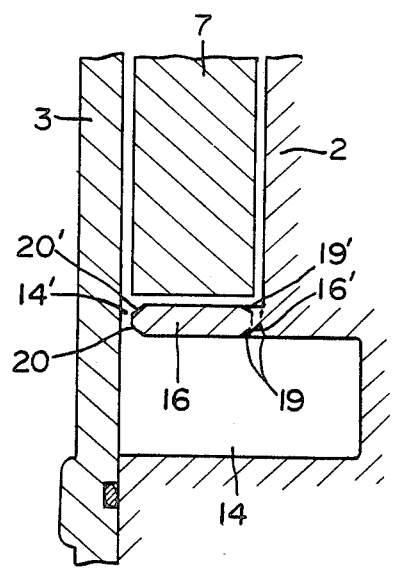
FIG. 16 is an enlarged cross-sectional view of another embodiment of the gap for introducing oil and the connecting hole of the present invention.
Figure 17:
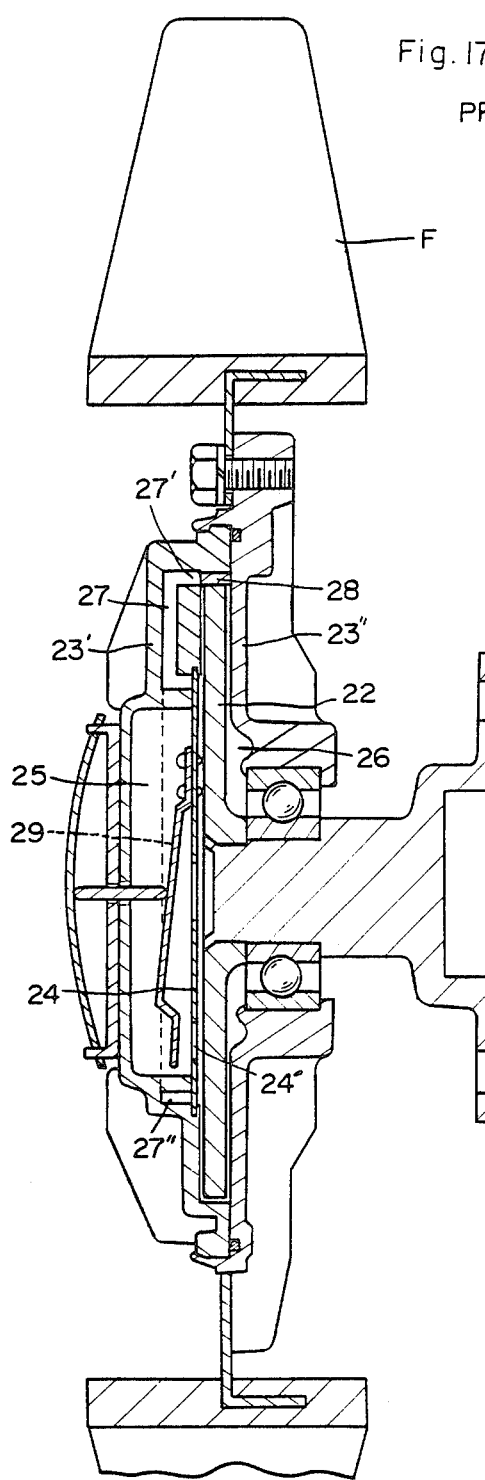
FIG. 17 is a vertical cross-sectional view of a conventional fan coupling device.

As shown in an embodiment in FIGS. 14 to 16, at least one connecting hole 16' that is connected to the idle oil accumulating chamber 14 may be bored in the annular separating wall 16 for the purpose of accelerating oil discharge into the idle oil accumulating chamber 14 in association with the introducing gap 14'.

The outer walls of the connecting hole 16' and the introducing gap 14' in the axial direction are arranged to be formed on substantially the same plane as the inner surface of the outer periphery of the cover 3 and the case 2 in the torque transmission chamber 4. Furthermore, the outer walls are provided with outwardly tapered surfaces 19 and 20. Furthermore, the widths of the connecting hole 16' and the introducing gap 14' are respectively arranged to be greater than a gap between the outer surface of the driving disc 7 and the inner surfaces of the cover 3 and the case 2. Furthermore, as shown in FIG. 16, the annular wall 16 may project over the case 2, or tapered surfaces 20' and 19' may be provided for the inside portions of the introducing gap 14' and the connecting hole 16' for the purpose of accelerating introduction of oil into the idle oil accumulating chamber 14.

Figure 18:
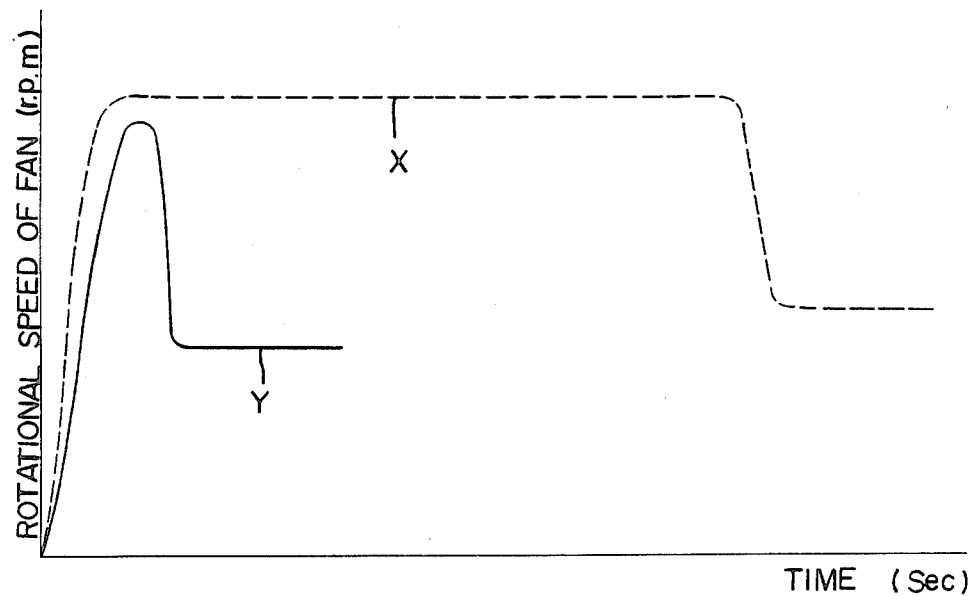
FIG. 18 is a characteristics curve used to compare the characteristics of the present invention with the prior art.

As described above, the device according to the present invention is provided with an annular idle oil accumulating chamber 14 which is connected to the introducing gap 14', the introducing gap 14' being connected to the torque transmission chamber 4 and disposed outer than the dam 12 in the sealed chamber in the radial direction. Furthermore, the separating plate 5 is provided with the penetrating hole 5" for naturally flowing oil between the oil accumulating chamber 6 and the torque transmission chamber 4 only when the device is stopped. Thanks to the aforementioned structure, even if the device is stopped in the state in which a great quantity of oil accumulates in the torque transmission chamber 4 due to the high temperature actuation, oil can naturally flow during the stoppage from the torque transmission chamber 4 to the oil accumulating chamber 6 through the penetrating hole 5". Furthermore, since the idle oil accumulating chamber 14 having substantially the same capacity as the quantity of oil which has already accumulated in the torque transmission chamber 4 and the idle oil accumulating chamber 14 is provided, when an engine is started, oil accumulated in the torque transmission chamber 4 can be immediately delivered into the idle oil accumulating chamber 14 with the aid of centrifugal force of oil generated in accordance with rotation of the sealed chamber. As a result, oil is enclosed in the idle oil accumulating chamber 14. As a result of this, oil remained in the torque transmission chamber becomes almost empty. The above described state is illustrated by a performance curve Y in FIG. 18.

Furthermore, since the sub-dam 17 is provided, oil flowing in the torque transmission chamber 4 along the outer surface of the driving disc 7 is stopped, whereby the pressure of oil is raised at the inlet port 13' in such a manner that the pressure exceeds that of oil in the oil accumulating chamber 6. As a result of this, oil can be securely pumped out into the circulated passage 13.

Furthermore, the introducing gap 14' is formed between the projecting walls 2' and 3' which are formed on the inner space dividing annular wall. The outer wall of the introducing wall 14'" facing in the circumferential direction is formed in substantially the same plane as the inner surface of the outer periphery of the case 2 and the cover 3. The width of the outer wall of the introducing gap 14''' is arranged to be large and is provided with the tapered surface 18. Alternatively, the introducing gap 14' and the connecting hole 16' which are provided in a penetrated manner in the separating wall 16 are provided. Furthermore, the outer wall in the axial direction of the introducing gap 14' and the connecting hole 16' is formed on substantially the same plane as the inner surface of the outer periphery of the case 2 and the cover 3. The width of the outer wall is arranged to be large one, and is provided with tapered surfaces 20 and 19. Therefore, unbalance of distribution of oil caused in the case 2 side and/or the cover 3 side can be reduced, the oil flowing by centrifugal force through the torque transmission gap 14' and the connecting hole 16' in a radial direction toward the idle oil chamber 14. Furthermore, oil discharging function can be significantly improved, whereby oil can be enclosed in the idle oil accumulating chamber 14. As a result of this, oil in the torque transmission chamber 4 becomes almost empty.

As described above, since the penetrating hole 5'', the idle oil accumulating chamber 14 which is connected to the torque transmission chamber 4, and the introducing gap 14' disposed between the projecting walls 2' and 3' or the introducing gap 14' and the connecting hole 16' are provided for the thermal response type fluid fan coupling device according to the present invention, oil in the torque transmission chamber 4 can be discharged into the idle oil accumulating chamber 14 as soon as the engine is again started. Furthermore, the oil delivery can be significantly efficiently carried out by means of the introducing gap 14' between the projecting walls 2' and 3' or the introducing gap 14' and the connecting hole 16'. As a result of this, oil can be enclosed in the idle oil accumulating chamber 14, while the torque transmission chamber 4 becomes almost empty. Consequently, uneven rotation of the follower side can be kept for a very short time after the engine has been started. Therefore, rapid increase in fan speed can be prevented, thereby abnormal noise of the fan can be prevented, effective warming-up can be performed, and the uneven rotation of the follower side can be significantly efficiently prevented even when the engine is again started after it is stopped through high temperature operation.

Furthermore, since the sub-dam 17 is provided in the idle oil accumulating chamber 14, oil flowed by the rotation of the driving disc 7 through the inside of the torque transmission chamber 4 can be securely sent to the circulated passage 13 with the aid of the function of the dam. Consequently, the fan speed can be controlled in accordance with the change in the ambient temperature.

We claim:

1. A thermal response type fluid fan coupling device for an internal combustion engine wherein:
    the inside of a sealed chamber which is supported on a rotational shaft whose tip is provided with a driving disc through a bearing and which comprises a case and a cover having cooling fans on the exterior surface thereof is divided by a separating plate which has an oil flow adjusting hole into an oil accumulating chamber and a torque transmission chamber accommodating said driving disc;
    a dam is formed between an exterior surface of said driving disc and an inner surface of said sealed chamber for the purpose of introducing oil into a circulated passage connecting said torque transmission chamber and said oil accumulating chamber;
    the inside of said sealed chamber is provided with a valve member which is arranged to open said flow adjusting hole in said separating plate when the ambient temperature exceeds a predetermined level and to close the same when the ambient temperature falls below a predetermined level in association with transformation of a thermosensitive body provided on the front surface of said cover, said transformation occuring in accordance with the change in the ambient temperature;
    an effective oil contact area in a gap portion for transmitting torque which is disposed between the surfaces of said case and cover and the surface of said driving disc, the surfaces opposing each other at the outer periphery of said driving disc is increased or decreased in order to control the torque transmission from the rotational shaft to the follower side of said sealed chamber, said thermal response type fluid coupling device being characterized in that an idle oil accumulating chamber which is connected to an introducing gap that is connected to said torque transmission chamber is provided at an outer position over a dam in the radial direction in said sealed chamber side and oil introducing means which is arranged to communicate said oil accumulating chamber and said torque transmission chamber only when the engine is stopped is provided in said separating plate.

2. A thermal response type fluid fan coupling device according to claim 1, wherein said oil introducing means is a circular penetrating hole disposed at a central position of said separating plate.

3. A thermal response type fluid fan coupling device according to claim 1, wherein said oil introducing means is composed by a plurality of penetrating holes disposed on the same circumference of the axis of said separating plate.

4. A thermal response type fluid fan coupling device according to claim 1, wherein said idle oil accumulating chamber has a capacity which is substantially the same as the quantity of oil which accumulates, when the engine is stopped, in said torque transmission chamber and said idle oil accumulating chamber.

5. A thermal response type fluid fan coupling device according to claim 1, wherein a sub-dam is provided in the vicinity of an inlet port of said circulated passage adjacent to said dam.

6. A thermal response type fluid fan coupling device according to claim 5, wherein said sub-dam is formed by a projecting wall which in part encloses a portion of said introducing gap on the side corresponding to the rotational direction or a projecting wall projecting radially in said idle oil accumulating chamber.

7. A thermal response type fluid fan coupling device according to claim 1, wherein a plurality of projecting walls form said opposing walls of said case and said cover which form an annular wall for dividing the inside of said idle oil chamber in such a manner that said projections engage with each other with a required gap remained for introduction of oil.

8. A thermal response type fluid fan coupling device according to claim 7, wherein said introducing gap comprises a gap disposed in the substantially axial direction and a gap disposed in the circumferential direction, and an exterior wall of said gap in the circumferential direction is formed in substantially the same plane as an inner wall of the outer periphery of said cover and said case in said torque transmission chamber.

9. A thermal response type fluid fan coupling device according to claim 8, wherein said gap disposed in the circumferential direction has a tapered plane facing outwardly or inwardly.

10. A thermal response type fluid fan coupling according to claim 8, wherein said gap disposed in the circumferential direction has a width larger than the distance beween the outer surface of said driving disc and the inner surface of said cover or said case.

11. A thermal response type fluid fan coupling device according to claim 1, wherein said annular separating wall which forms said idle oil accumulating chamber is provided with at least one hole that is connected to said idle oil accumulating chamber.

12. A thermal response type fluid fan coupling device according to claim 11, wherein the outer walls of said gap for introducing oil and of said connecting hole which are axially disposed are formed in substantially the same plane as the inner wall at the outer periphery of said case and said cover.

13. A thermal response type fluid fan coupling device according to claim 11, wherein said gap for introducing oil and said connecting hole have a tapered surface on the inner edge or outer edge thereof.

14. A thermal response type fluid fan coupling device according to claim 11, wherein the width of each of said gap for introducing oil and said connecting hole is arranged to exceed the distances between the outer surface of said driving disc and both the inner surface of said case and the inner surface of said cover.

15. A thermal response type fluid fan coupling device according to claim 1, wherein said idle oil accumulating chamber is formed annularly in the outer circumferential wall of the sealed chamber.

* * * * *